United States Patent [19]

Farrington et al.

[11] 4,124,535
[45] Nov. 7, 1978

[54] PROCESS FOR MAKING AMPHORA AGGREGATES

[75] Inventors: Diane G. Farrington, Cleveland, Ohio; Gilbert K. Meloy, Earlville, Ill.

[73] Assignee: Standard Oil Company, Cleveland, Ohio

[21] Appl. No.: 831,456

[22] Filed: Sep. 8, 1977

[51] Int. Cl.² .............................................. B01J 37/00
[52] U.S. Cl. ........................................ 252/448; 264/14
[58] Field of Search ............ 252/448, 477 R; 264/13, 264/14, 15; 428/402

[56] References Cited

U.S. PATENT DOCUMENTS 2,974,110  3/1961  Callahan ................................ 252/448
3,496,115  2/1970  Vesely .................................... 252/448
3,966,639  6/1976  Callahan et al. ..................... 252/477 R

*Primary Examiner*—Wm. J. Shine
*Attorney, Agent, or Firm*—Herbert D. Knudsen; John E. Miller, Jr.

[57] ABSTRACT

Aggregates having the amphora shape are produced by a process comprising dropping droplets of a slurry capable of being chemically gelled or solidified into a container containing a middle liquid phase capable of chemically gelling or solidifying the slurry, an upper liquid phase above the middle liquid phase and a lower liquid phase below the middle liquid phase, the components of the slurry exhibiting substantially no solubility in the upper and lower phases.

12 Claims, No Drawings

PROCESS FOR MAKING AMPHORA AGGREGATES

BACKGROUND OF THE INVENTION

The present invention relates to a novel process for preparing aggregates, and in particular aggregates having a void center and a single cavity in the external surface communicating to the void center referred to as "amphora".

The formation of aggregates by the agglomeration of distinct particles has been accomplished by many methods. The most common technique involves compaction of particles normally together with a binder to form a tablet. Also known is a process in which a slurry comprising a suspending liquid containing distinct particles of a solid is dropped on a particulate bed. See U.S. Pat. No. 3,966,639; the disclosure of which is incorporated herein by reference. As taught in this patent, it is possible to produce aggregates having a void center and a single cavity in the external surface communicating to the void center by suitable control of the operating conditions. Aggregates of this structure, referred to as "amphora," have been found to be ideally suited for use in the manufacture of catalysts for various types of fixed-bed catalytic reactions.

SUMMARY OF THE INVENTION

In accordance with the present invention, it has now been found that catalysts having the amphora shape can be made by dropping a slurry comprising a suspending liquid and distinct particles of a suspended solid, the slurry being capable of being chemically gelled or solidified, into a tower filled with three distinct liquid phases. The three distinct liquid phases are arranged one atop the other with the center phase comprising a material which will cause gelation or solidification of the slurry. The upper and lower phases comprise materials exhibiting little or no solubility with respect to the slurry and with respect to the middle phase. By simply dropping slurry in the form of droplets into the tower and allowing the slurry droplets to fall through the tower and remain in lower phase for a short period of time, it has been found that hardened aggregates having the amphora shape will be produced.

Thus, the present invention provides a novel process for forming aggregates having the amphora shape which comprises: dropping droplets of a slurry capable of being chemically gelled or solidified and comprising a suspending liquid and at least one solid suspended in the suspending liquid into a container containing a middle liquid phase capable of chemically gelling or solidifying the slurry, an upper liquid phase above and in contact with the middle liquid phase and a lower liquid phase below and in contact with the middle liquid phase, the components of the slurry exhibiting substantially no solubility in the upper and lower phases; allowing the droplets to fall through the upper liquid phase, the middle liquid phase and the lower liquid phase whereby the droplets partially solidify; recovering the partially solidified droplet from the lower liquid phase; and drying the agglomerates to obtained.

DETAILED DESCRIPTION

SLURRY

In carrying out the present invention, the particulate solid to be agglomerated is first formed into a slurry. This slurry may vary widely in composition and comprises at least two components, a suspending liquid and distinct particles of a suspended solid.

The suspending liquid may be essentially any liquid which will suspend the solid. These liquids, of course, may vary widely in nature. Some of the liquids are capable of dissolving large quantities of the solid; whereas, others dissolve little or no solid. Although some liquids are more compatible with the techniques of the present invention, any suspending liquid can be used so long as it can suspend the particulate matter therein.

Liquids suitable for use as the suspending liquid in the present invention include: water; alcohols, such as methanol, ethanol, butanol and hexanol; ethers, such as methyl ether, ethyl ether and the like; ketones, such as acetone, methyl ethyl ketone, methyl i-butyl ketone and the like; esters, such as methyl acetate, butyl propionate and the like; hydrocarbons, such as hexane, cyclohexane, kerosene and the like; chlorinated hydrocarbons, such as methylene chloride, 1,1,1-trichloroethane, perchloroethylene and the like; aromatic compounds, such as benzene, toluene, chlorobenzene and the like; and any other liquid that is capable of suspending the solid in the slurry. The suspending liquid may be any of these materials individually or any combination of liquids.

Normally, less preferred are the liquids having a very low or a very high vapor pressure. These liquids, however, can be employed so long as the liquid can be removed.

Preferred in the present invention is the use of water as the suspending liquid. This liquid is inexpensive and conveniently removed from the slurry droplet by a number of techniques.

The second component of the slurry is the solid which is suspended in the suspending liquid. This solid may vary widely in composition. It may be a single material, or it may be a combination of two or more solid materials. Moreover, the solid material may have many functions in the final aggregate. For example, the solid material may be the active ingredient of the final product, it could be the binder; it could be a porosity improver; it could be an extender; it could be a surfactant; or it could serve any other function.

Any of these solids may be soluble to almost any extent in the suspending liquid, but the total combination of solids and liquid must be a slurry. Preferred slurries contain at least about 5 percent by weight of insoluble solids based on the weight of the suspending liquid under the conditions of droplet formation, with slurries containing 50 to 75 percent by weight, most preferably 60 to 70 percent by weight, of insoluble solids being especially preferred. In any particular application, however, the preferred amount of insoluble solids is highly dependent upon the solid agglomerated and the suspending liquid employed in the invention.

As noted, there is essentially no limit on the type of materials that may be formed into aggregates by the process of the invention. The only criterion that must be met is that there is a liquid in which the solid can be slurried under the conditions of droplet formation.

Broad representative examples of the solids that may be employed in the present invention include: catalyst materials and catalyst precursors; clay; agricultural chemicals, such as urea, ammonium nitrate, herbicides and insecticides; polymers, such as polyethylene, polypropylene, polystyrene, polymethylmethacrylate, and high-nitrile resins; and other materials such as acids, bases, polyurethane intermediates, detergents, metals, metal oxides, metal organic compounds, metal salts, solid organic compounds, pharmaceutical chemicals, food products, carbohydrates and the like. Any of these solids could be used in the process of the invention.

The slurry of the invention may contain other components which are specifically designed to enhance the desirability of the aggregate formed. These components may be dissolved or suspended in the suspending liquid to serve various functions. For example, materials may be suitably included in the slurry as binders, porosity improvers, extenders and the like.

Many of the suspended solids in the slurry can be processed by the present invention to prepare a desirable hard aggregate. Others, while forming an aggregate, may not possess the desired attrition resistance. Binders can be incorporated into the slurry to rectify this problem. Suitable binders include hydrous oxide gels, such as silica gels and alumina gels and adhesives such as natural and synthetic resins including rosin, pitch, polyvinyl acetate, phenol-formaldehyde resins and the like. Essentially, any material that increases the cohesiveness of the resulting aggregate may be used.

Porosity improvers can also be added to the slurry. Such porosity improvers are normally materials that are initially incorporated into the structure of the aggregate and then after the aggregate is formed, these improvers are removed by some appropriate technique. For example, a very high boiling liquid which is not removed in the process of the invention may be incorporated into the slurry. When the aggregate is formed, this liquid is entrapped in the solid. The liquid is then removed by calcining the aggregate at a high temperature. The escape of the vapors of the high boiling liquid creates a particle having greater porosity. As a second example, a combustible or decomposable substance can be incorporated into the slurry. Again these particles are entrapped in the aggregate. Their removal by combustion or decomposition gives an aggregate of greater porosity.

A third desired modification of the slurry is the use of extenders. This is the incorporation of materials into the slurry which do not significantly affect the activity of the product in its intended use. For example, when aggregates of an active herbicide are made by the process of the present invention, inert ingredients could be added to protect the desired plants from damage that would result if only the pure herbicide formed the aggregate. Thus, the activity of the herbicide is diluted to an appropriate concentration.

Of course, these are only some of the examples of components of the slurry which are added for a designed purpose. Other ingredients could be added to accomplish other results. For example, a combination of two noninterfering catalytic ingredients could be produced in a single aggregate. These aggregates could be placed in a catalytic reactor, and the reactor could be alternately or concurrently used for two different reactions without changing the catalyst charge.

A preferred application of the invention is its use to prepare catalyst aggregates from active catalyst components or catalyst precursors. The present invention can be used to prepare a strong, attrition-resistant aggregate which is very suitable for fixed-bed catalytic reactions. These aggregates are conveniently made without the complex extrusion of tableting equipment normally required in pelleting operations.

One important application of the invention is the use of the process to prepare catalysts used in oxidation, ammoxidation or oxidative dehydrogenation reactions. Of special significance among these catalysts are those which contain at least the compounds of bismuth and compounds of molybdenum. Thus, in one embodiment of the process of the present invention, the suspended solid is preferably one which contains at least bismuth and molybdenum. Also preferred because of the desired catalyst prepared are the catalyst which contain at least iron, bismuth and molybdenum. Thus, in this embodiment, the suspended solid is preferably one which contains at least the compounds of these three metals.

Even though the nature of the solid suspended is not critical, the size of the suspended solid in the slurry is important. The suspended solid must be of such a size that droplets of the appropriate size may be formed. Of course, this means that the size of the particle permissible in the slurry is a direct function of the size of the droplet to be formed. If the size of the droplet is small, the particles of solid in the slurry must be small enough to accommodate the droplet. With larger droplets, larger particles of the suspended solid can be tolerated.

In the present invention, good results are normally obtained by using a suspended solid in the slurry with a particle size of less than about a millimeter, with those having the particle size of less than about 0.2 millimeter being of special interest because of the desirable aggregate form. Especially good results are obtained when using non-active hydrated alumina ($\alpha$-trihydrate, i.e. Gibbsite) in which 65 to 80% is 325 mesh or smaller. The significant advantage of small particles is that the resulting aggregate tends to be more cohesive.

In the slurry, the suspended particles are discrete entities. They are spatially separated throughout the slurry by the suspending liquid. In the process of the invention, these separate and distinct particles are agglomerated into an aggregate without the use of a particle bed associated with the process described in U.S. Pat. No. 3,966,639.

An important feature of the slurry is that it can be gelled or solidified chemically. When the slurry droplets formed into the upper phase pass into and through the middle phase, the essentially spherical shape of the droplets is "frozen in" by the solidification or gelation of the droplet surface. In order that the slurry is gelable or solidifiable chemically, it is necessary that at least one of the components of the slurry other than the suspending liquid be chemically reactive with the middle liquid phase in the tower. The chemically reactive component in the slurry may be the particulate solid to be agglomerated. Alternatively, the chemically reactive component may be a binder or gelling agent which is added to the slurry for the specific purpose of making the slurry gelable or solidifiable. Also, the chemically reactive component of the slurry may be either suspended in or dissolved in the suspending liquid.

The concentration of the gelable or solidifiable component of the slurry may vary between wide limits and will be different for different applications. The absolute amount of gelable or solidifiable component in the slurry is unimportant, so long as there is sufficient gelable or solidifiable component to cause solidification or gelation of the surface of the droplet as it falls through the middle liquid phase of the tower.

In the preferred embodiment of the present invention in which hydrated alumina is the particulate solid to be agglomerated, and water is preferably the suspending liquid, the slurry preferably contains aluminum nitrate, Al(NO$_3$)$_3$·9H$_2$O, as a binder in an amount of 5 to 100 preferably, 20 to 50, most preferably 35, weight percent with respect to the alumina. Aluminum nitrate reacts with a base to yield alumina gel thereby producing a completed aggregate comprising all alumina.

Tower

In accordance with the present invention, the slurry formed as indicated above is dropped into a tower containing three distinct liquid phases. The three different phases are arranged one atop the other so that the droplets of slurry fall through an upper phase, a middle phase and a lower phase. Preferably, the different liquid phases are compounded so that the highest density liquid is on the bottom, the middle density liquid is in the middle and the lowest density liquid is on the top so that the liquid phases will automatically assume their desired position in the tower.

The compositions of the three different liquid phases is unimportant so long as the upper and lower phases do not interfere with the gelation or solidification reaction occurring in the middle phase and so long as the middle phase will gel or solidify the slurry droplets. Thus, the upper and/or lower liquid phases may undergo chemical reaction with one or more components of slurry. However, preferably the upper and lower phases are inert with respect to the slurry as well as the middle phase. Also, although the upper and/or lower liquid phases may exhibit some solubility in the middle phase, it is preferable that the upper and lower phases be substantially immiscible in the middle liquid phase. In this connection, since the three phases must be separated from one another for proper operation of the present invention, it is desirable that the middle liquid phase not mix with the upper or lower liquid phases so that the middle liquid phase need not be continuously replaced.

Normally, the middle liquid phase is selected to have the same character (i.e. organic or inorganic) as the slurry while the upper and lower liquid phases are opposite in character to the slurry. Thus, in the preferred embodiment of the invention in which an aqueous slurry is employed, the middle liquid phase is normally aqueous while the upper and lower liquid phases are organic.

In order to hold the three separate liquid phases using the inventive process, any type of container or tower can be employed. However, the container or tower must be of sufficient height to accommodate the three liquid phases of the present invention.

In this regard, it has been found that the heights of the middle phase and the upper phase play an important part in the results obtained by the present invention. When the slurry is dropped in droplet form into the tower and passes through the upper liquid phase, the slurry droplets assume an almost perfect spherical shape provided that the droplet travel path is long enough. Therefore, the height of the upper liquid layer should at least be sufficient so that the droplets dropped therein assume the desired spherical shape. Normally, this means that the height of the upper liquid phase should be at least about 7 centimeters, preferably at least 20 centimeters and most preferably at least 50 centimeters. Upper liquid phases having larger heights can be used, there being no upper limit aside from practical considerations on the height of the upper liquid layer.

The height of the middle liquid layer is also an important variable in the inventive process. In accordance with the present invention, it has been found that the residence time of the liquid droplets as they fall through the middle liquid layer determines whether the agglomerates ultimately produced have the amphora shape, a spherical shape or the shape of a flat dish. If the residence time in the middle layer is too short, then the agglomerates ultimately produced will not have the desired amphora shape. Selection of the height of the middle phase in a particular application of the inventive process is dependent on many different factors such as chemical composition, concentration of ingredients, viscosity, density and the like, and can best be done by a simple trial and error procedure. As a guide, it has been found that 10 centimeters of a 27% aqueous solution of NH$_4$OH is sufficient to insure the formation of amphora from an alumina slurry containing about 57 weight percent alumina and 11 weight percent aluminum nitrate while 10 centimeters of a 13.5 percent aqueous solution of NH$_4$OH solution is insufficient.

The bottom liquid phase in the tower according to the present invention functions merely to receive the droplets passing out of the middle layer and to hold these droplets while they develop their amphora shape. The height of the bottom liquid phase is therefore unimportant, and any height can be employed so long as there is sufficient liquid to receive and hold the droplets passing out of the middle layer for suitable period of time. Normally it takes about 2 to 4 minutes for the amphora shape to develop in the droplets after they pass into the bottom layer, and under these operating conditions it has been found that at least about 10 centimeters of liquid should be employed for the lower liquid phase.

Process Conditions

In the practice of the present invention, the slurry described is formed into droplets, and the slurry droplets are dropped into the liquid in the tower. The particular manner in which the droplets are formed and dropped into the tower is unimportant, and any known method can be employed. For example, devices such as medicine droppers can be conveniently used. In a commercial operation, a device for forming a plurality of droplets at one time such as described in U.S. Pat. No. 3,966,639 would normally be necessary.

The size of the aggregates formed is directly proportional to the size of the droplet. As the size of the slurry droplet is increased, the size of the aggregate is increased. Using essentially uniform droplets under a given set of operating conditions, yields of substantially uniform aggregate are obtained.

When slurry droplets are dropped into the three-phase liquid system of the present invention, they initially form essentially spherical droplets as indicated above. As the slurry droplets pass through the interface between the upper and middle phases, it has been observed that a droplet of the upper liquid layer forms on top of the descending slurry droplet. As the slurry droplet descends through the middle liquid phase, the upper liquid phase droplet remains attached to the slurry droplet and is transferred along with the slurry droplet to the lower liquid phase. Normally, the upper liquid phase and the lower liquid phase are miscible with one another so that the upper liquid phase droplet dissolves in the lower liquid phase as the slurry particle enters the lower liquid phase. Once the slurry droplet reaches the lower liquid phase it assumes an amphora shape usually in about 2 to 4 minutes although longer times may be required. Sometimes, the amphora shape will not develop in the lower liquid phase at all regardless of the residence time of the aggregate in the lower liquid phase. In these instances, it has been found that aggregates of this type will develop the amphora shape after being removed from the lower liquid phase and allowed to dry provided that the aggregates are at least dimpled before they are removed. Also, if the aggregates are withdrawn from the lower liquid phase prior to complete formation of the amphora shape, care should be taken to prevent removal of the residual amounts of middle liquid from the surfaces of the agglomerates since removal of the middle liquid may prevent the amphora shape from fully developing. This can be done by directly drying the agglomerates after they are removed from the lower liquid phase.

After a suitable residence time in the lower liquid phase, the aggregates are removed therefrom and dried. Gelation and/or solidification of most of the outer surface of the slurry droplets causes the droplets to be self-supporting so that they can be handled without rupture. However, in this stage the partially hardened slurry droplets are still relatively fragile. According to the present invention, therefore, the slurry droplets removed from the lower liquid phase are immediately dried in order to remove the residual slurry liquid therefrom and produce a hardened aggregate.

Drying of the partially hardened slurry drops can be accomplished by any technique known in the art. For example, the slurry drops can be simply placed on a surface and allowed to dry in air or the partially hardened slurry drops can be heated in an oven, bomb or with flowing air.

Once the aggregates are dry, they can be used as is. Or, if desired, they can be calcined at elevated temperature to further improve their hardness properties. For example, if the aggregates are formed from silica, alumina or other refractory material, calcining at an elevated temperature, e.g. >500° C., will cause further improvement in the hardness of the aggregates. Of course, if the aggregates are made from a material having a low decomposition temperature, such as for example a low melting thermoplastic resin, calcination should be avoided.

As described above, the present invention provides a simple and straightforward technique for forming aggregates having the amphora shape. Although not wishing to be bound to any theory, it is believed that the formation of the amphora shape occurs because of the differential solidification rate which is attributable to the formation of a droplet of the upper phase liquid on the top of the descending slurry sphere as the slurry sphere passes through the interface between the upper liquid phase and the middle liquid phase. As the slurry sphere descends through the middle liquid phase, solidification or gelation occurs at the slurry sphere surface except for the area covered by the upper liquid phase droplet. Such a situation permits rapid gelation and consequently rigidization of a major portion of the slurry sphere surface with a minor area beneath the upper liquid phase droplet maintaining greater fluidity and plasticity. As solidification continues, shrinkage accurs. The particle first forms a hollow center, and then, to relieve surface stresses and minimize surface energy, the area of greater fluidity shrinks into the particle and the amphora hole is thereby "pulled." In any event, it has been found that aggregates having the amphora shape can be produced with great simplicity and ease by the technique described.

Preferred Embodiment

In the preferred embodiment, the inventive process is employed to form catalytic agglomerates ideally suited for use as the catalyst in various fixed-bed catalytic reactions such as oxidation, oxydehydrogenation and ammoxidation. In such reactions, the catalysts to be employed are composed of agglomerates comprising an active catalytic component and a carrier such as silica, alumina or the like. The active catalytic component or catalyst precursor can either be homogeneously intermixed with the carrier component, impregnated on the amphora particle, or coated onto the surfaces of an aggregate formed from the carrier. Impregnation is preferable to coating since impregnation leaves active catalyst in all pores of the support particle, whereas coating deposits active catalyst only on outer surface of the support particle. In accordance with the present invention, catalysts of the former type, i.e. catalysts comprising a mixture of the active catalyst component and the carrier and having the amphora shape can be made in a very simple manner.

In making catalysts it is preferable to use an aqueous slurry of activated alumina to form the amphora. Although the total solids content of the alumina slurry can vary significantly, the solids content is preferably between 50 and 75 weight percent, preferably 60 and 70 weight percent. In addition to water and activated alumina, the slurry also preferably contains aluminum nitrate, i.e. $Al(NO_3)_3 \cdot 9H_2O$. Aluminum nitrate reacts in an alkaline medium to produce aluminum hydroxide gel which in turn can be transformed into $Al_2O_3$ by heating. Thus extraneous components are not introduced into catalysts when aluminum nitrate is used as a gelling agent. In addition, the slurry may also contain a suitable amount of an active catalytic component which may be, for example, oxides, hydroxides or nitrates of various different metals such as bismuth, molybdenum, phosphorus, cobalt, nickel, iron, potassium, cesium and so forth.

The liquids to be used in the tower in this embodiment of the present invention can be selected in accordance with the description given above. Normally, the middle liquid phase will be composed of a suitable base dissolved in water. In order to prevent extraneous metals from being introduced into the catalyst, it is peferred that the base is thermally decomposable so that the cation of the base will be removed from the system upon subsequent calcination. Ammonium hydroxide is a good example of such a base. Other thermally decomposable bases can be employed.

The liquids selected for the upper and lower liquid phases are inert to and preferably essentially immiscible with the aqueous alkaline middle liquid phase. Essentially any liquid organic compound meeting the foregoing requirements can be employed. Especially useful are the hydrocarbons and substituted hydrocarbons such as benzene, the alkanes (e.g. pentane, hexane, heptane, octane and so forth), chloroform, carbon tetrachloride, mineral oil and so forth. Mixtures of such compounds can also be employed. Advantageously, the liquid selected for the lower liquid phase has a greater density than the liquid selected for the upper liquid phase so that the phases will automatically assume their proper position in the tower. In an especially preferred embodiment of the invention, benzene is used for the upper liquid phase, and a mixture of chloroform and benzene in a ratio of from 1:3 to 1:9 is used as the lower liquid phase.

The height of the various liquid phases of this embodiment of the present invention can also be conveniently selected in accordance with the foregoing description. Liquid level heights between 50 and 80 centimeters have been found to be convenient for the upper liquid level layer while liquid level heights of from about 10 to 20 centimeters have been found useful for the middle liquid layer, depending upon the concentration of base therein. Higher concentrations of base require smaller liquid levels whereas lower concentrations of base require larger liquid levels. Liquid level heights of at least 10 centimeters have been found convenient for the lower liquid phase although an 8 centimeter liquid level height is also useful.

The partially hardened amphora-shaped aggregates formed in accordance with this embodiment of the present invention which are recovered from the lower liquid phase are subjected to drying as indicated above. Thereafter, the hardened aggregates are subjected to calcining in order to improve the crush strength of the aggregates ultimately produced. Calcining at an elevated temperature also effects thermal decomposition of the catalyst precursors (e.g. the salts and hydroxides of the various metals introduced into the slurry) thereby yielding the catalytic metals in active complex oxide form. Calcination also drives off any ammonium cation that may be in the agglomerates.

Working Examples

In order to more fully describe the present invention, the following working examples are presented:

EXAMPLE 1

An aqueous alumina sol containing non-active hydrated alumina (Harshaw U-10199-82) having a particle size of <325 mesh and aluminum nitrate, $Al(NO_3).9-H_2O$ were mixed together to provide a slurry containing 68.5 weight percent solids with the ratio of the aluminum nitrate hydrate to alumina being 0.35. A mixture of chloroform and benzene in a ratio of 1:3 by weight was charged into a glass tube, 20 mm. in diameter, to a height of 10 centimeters. Next, a 27% aqueous solution of $NH_4OH$ was charged into the tube to a height of 20 centimeters, the total height of the ammonium hydroxide layer plus the organic layer being 30 centimeters. Finally, benzene was charged into the tube to a height of 50 centimeters, the total height of the three liquids in the column being 80 centimeters. The three different liquids remained separated from one another in three distinct liquid phases, the aqueous ammonium hydroxide remaining in the middle and the benzene remaining on top.

Droplets of the slurry were dropped onto the upper surface of the upper benzene layer by means of an eye dropper. The droplets were observed to form essentially perfect spheres as they fell through the upper benzene layer to the interface between the benzene/ammonium hydroxide layer. As each droplet passed through the interface, a hydrocarbon droplet was observed to form on the top of each slurry droplet. The slurry droplet and the hydrocarbon droplet remained together as they fell through the ammonium hydroxide layer. When the slurry droplet and hydrocarbon droplet passed through the interface between the ammonium hydroxide and the lower organic layer, the hydrocarbon droplet was observed to dissolve into the chloroform/benzene layer. These slurry droplets were allowed to rest in the chloroform/benzene layer. After about 2 to 4 minutes, it was observed that these slurry droplets changed shape from spherical to amphora. The amphora droplets were removed from the lower hydrocarbon layer, placed on a piece of paper and allowed to dry to produce hardened agglomerates with the amphora shape.

EXAMPLE 2

Example 1 was repeated except that the ammonium hydroxide layer was only 10 centimeters rather than 20 centimeters in height and the agglomerated droplets were air dried in an oven at 135° C. As in Example 1, hardened agglomerates having the amphora shape were obtained.

EXAMPLE 3

Example 2 was repeated except that the hardened agglomerates were air dried in the open. As in Examples 1 and 2, agglomerates having the amphora shape were obtained.

EXAMPLE 4

Example 2 was repeated except that the concentration of ammonium hydroxide in the aqueous ammonium hydroxide layer was only 13.5%. Also, the agglomerates were partially air dried on paper before being placed in an oven. Amphora agglomerates were not obtained because the product had insufficient strength to hold itself together. This is attributable to the fact that the concentration and/or height of the ammonium hydroxide layer was insufficient to effect the necessary surface gellation.

EXAMPLE 5

Example 4 was repeated except that the concentration of ammonium hydroxide in the ammonium hydroxide layer was 6.25 weight percent. As in Example 4, no amphora were obtained because the product had insufficient strength to hold itself together.

EXAMPLE 6

Example 2 was repeated except that the concentration of ammonium hydroxide in the middle liquid layer was 15 weight percent. Also, the agglomerates recovered from the lower organic phase were first fan dried at 55° C. for 5 minutes and then oven dried at 135° C. for one-half hour. Hardened agglomerates having the amphora shape were obtained.

EXAMPLE 7

Droplets of the slurry described in Example 1 were dropped into a tower having a total liquid height of 70 centimeters, the tower containing 10 centimeters of a mixture of chloroform to benzene in a weight ratio of 1:9 as the lower liquid phase, 10 centimeters of a 20% aqueous ammonium hydroxide solution as the middle liquid phase and 50 centimeters of benzene as the upper liquid phase. The agglomerates obtained from the bottom organic layer were separated into six different portions and dried by various different techniques. After drying, some of the hardened agglomerates were calcined while others were not. In each instance, hardened agglomerates having the amphora shape were obtained.

EXAMPLE 8

Example 7 was repeated except that the agglomerates withdrawn from the lower organic layer were washed in water prior to drying. Also, drying was accomplished by fan drying in air at 25° to 40° C. for 5 minutes followed by drying in a crucible at 130° to 135° C. for 1 and ¾ hours. Thereafter, the particles were calcined in a crucible at 525° C. for 1 and ¾ hours. The product obtained were hollow spheres which did not exhibit the amphora shape.

The absence of the amphora shape is believed to be due to the removal of some of the ammonium hydroxide from the surface of the agglomerates. In a number of the foregoing examples, the amphora shape develops only after the drops are removed from the liquid as the liquid centers of the drops dry and the hole is pulled. Removal of the ammonium hydroxide from the surfaces of the droplet prevents formation of a gel since there is no more hydroxyl ion to react with $Al(NO_3)_3$ and thereby form $Al(OH)_3$ gel. Since the gelling reaction is prevented, change in shape of the agglomerate due to the changes in surface tension and so forth occurring during gellation are also prevented.

EXAMPLE 9

Example 2 was repeated except that the amphora agglomerates withdrawn from the lower organic phase were dipped into a 50 weight percent aqueous solution of aluminum nitrate for one minute and then dried at 30° to 50° C. for 1 minute and at 135° C. for 20 minutes. Thereafter, the hardened agglomerates were calcined at 525° C. for 2 hours. The agglomerate product obtained was composed of amphora particles with increased crush strength.

EXAMPLE 10

A slurry made from the same components as Example 1 was compounded to have 75 weight percent solids with a ratio of aluminum nitrate to alumina of ¼. Droplets of this slurry were dropped into a tower containing a mixture of chloroform and benzene in a weight ratio of 1:3 and at a height of 10 centimeters as a liquid phase, 5 centimeters of a 27% aqueous solution of ammonium hydroxide as the middle liquid phase and 50 centimeters of benzene as the upper liquid phase. The agglomerates recovered from the lower liquid phase were fan dried for five minutes, oven-dried at 130° C. for 5 minutes, and then calcined in a crucible at 525° C. for 1 and ¼ hours. The product obtained was pearshaped and hollow. Substantially no amphora was obtained, which was due to the insufficient height and/or concentration of the ammonium hydroxide layer.

Although only a few embodiments of the present invention have been described above, many changes can be made without departing from the spirit and the scope of the invention. All such changes are intended to be included within the scope of the present invention, which is to be limited only by the following claims.

We claim:

1. A process for forming amphora aggregates comprising: dropping droplets of a slurry capable of being chemically gelled or solidified and comprising a suspending liquid and at least one solid suspended in said suspending liquid into a container containing a middle liquid phase capable of chemically gelling or solidifying said slurry, an upper liquid phase above and in contact with said middle liquid phase, and a lower liquid phase below and in contact with said middle liquid phase, the components of said slurry exhibiting substantially no solubility in said upper and lower liquid phases; allowing said droplets to fall in order through said upper liquid phase, said middle liquid phase and said lower liquid phase whereby said droplets partially gel or solidify; recovering the partially gelled or solidified droplet from the lower liquid phase; and drying the agglomerates so obtained.

2. The process of claim 1, wherein said slurry is an aqueous slurry, said middle liquid phase is aqueous, and said upper and lower liquid phases are organic.

3. The process of claim 2 wherein said at least one solid comprises silica, alumina or mixtures thereof.

4. The process of claim 3 wherein said at least one solid includes at least one of an active catalyst component and a catalyst precursor.

5. The process of claim 4 wherein said at least one solid includes molybdenum oxide and bismuth oxide or compounds capable of yielding bismuth oxide and molybdenum oxide when calcined.

6. The process of claim 4 wherein said slurry is an aqueous slurry of activated alumina containing 50 to 75 weight percent alumina solids.

7. The process of claim 6 wherein said aqueous slurry contains aluminum nitrate and further wherein said middle liquid phase contains hydroxyl ions.

8. The process of claim 7 wherein said at least one solid includes molydenum oxide and bismuth oxide or compounds capable of yielding bismuth oxide and molybdenum oxide when calcined.

9. The process of claim 8 wherein said agglomerates are directly dried after being removed from said lower liquid phase.

10. The process of claim 6 wherein said at least one solid includes molybdenum oxide and bismuth oxide or compounds capable of yielding bismuth oxide and molybdenum oxide when calcined.

11. The process of claim 3 wherein said slurry is an aqueous slurry of activated alumina containing 50 to 75 weight percent alumina solids.

12. The process of claim 11 wherein said aqueous slurry contains aluminum nitrate and further wherein said middle liquid phase contains hydroxyl ions.

* * * * *